US010093384B2

(12) United States Patent
Shimasaki

(10) Patent No.: US 10,093,384 B2
(45) Date of Patent: Oct. 9, 2018

(54) SUSPENSION DEVICE

(71) Applicant: Showa Corporation, Gyoda-shi (JP)

(72) Inventor: Masao Shimasaki, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 77 days.

(21) Appl. No.: 15/261,101

(22) Filed: Sep. 9, 2016

(65) Prior Publication Data

US 2017/0253290 A1    Sep. 7, 2017

(30) Foreign Application Priority Data

Mar. 4, 2016 (JP) .................. 2016-042426

(51) Int. Cl.
| | |
|---|---|
| B62K 25/08 | (2006.01) |
| F16F 1/04 | (2006.01) |
| F16F 9/16 | (2006.01) |
| F16F 9/32 | (2006.01) |
| F16F 9/06 | (2006.01) |

(52) U.S. Cl.
CPC ............. *B62K 25/08* (2013.01); *F16F 1/04* (2013.01); *F16F 9/064* (2013.01); *F16F 9/165* (2013.01); *F16F 9/3257* (2013.01)

(58) Field of Classification Search
CPC ... B62K 25/08; F16F 1/04; F16F 9/064; F16F 9/165; F16F 9/3257
See application file for complete search history.

(56) References Cited

U.S. PATENT DOCUMENTS

| 2,856,035 A | 10/1958 | Rohacs | |
|---|---|---|---|
| 8,800,973 B2 * | 8/2014 | Pelot | F16F 9/06 188/280 |
| 9,267,568 B2 * | 2/2016 | Noguchi | F16F 9/446 |

(Continued)

FOREIGN PATENT DOCUMENTS

| EP | 2413002 A | 2/2012 |
|---|---|---|
| JP | 11-280826 A | 10/1999 |

(Continued)

OTHER PUBLICATIONS

Extended European Search Report dated Aug. 16, 2017 for the corresponding European Patent Application No. 16188248.5.

*Primary Examiner* — Joseph M Rocca
*Assistant Examiner* — Michael R Stabley
(74) *Attorney, Agent, or Firm* — Leason Ellis LLP

(57) ABSTRACT

A suspension device includes a pair of suspensions each containing at least one of a damping mechanism and a suspension spring. A tubular body-side member is on a vehicle body side. A tubular wheel-side member is on a vehicle wheel side and coupled to the body-side member, and moves relative to the body-side member in an axial direction. A hollow cylindrical cylinder is inside of the body-side member and the wheel-side member and includes a weak portion in the axial direction on an outer side. A rod member is inside of the body-side member and the wheel-side member and moves relatively in the axial direction in accordance with movement of the body-side member and the wheel-side member. A first defining member secured to an end portion of the rod member and in contact with the cylinder movably in the axial direction of the cylinder defines space in the cylinder.

20 Claims, 13 Drawing Sheets

(56) References Cited

U.S. PATENT DOCUMENTS

| | | | |
|---|---|---|---|
| 2008/0230335 A1 | 9/2008 | Furuya et al. | |
| 2009/0001637 A1* | 1/2009 | Murakami | B62K 25/08 |
| | | | 267/118 |
| 2014/0116828 A1 | 5/2014 | Noguchi | |
| 2016/0339990 A1* | 11/2016 | Walthert | B62K 25/04 |

FOREIGN PATENT DOCUMENTS

| | | |
|---|---|---|
| JP | 2000-320598 A | 11/2000 |
| JP | 2007-309434 A | 11/2007 |
| JP | 2012-92945 A | 5/2012 |
| JP | 2013-228089 A | 11/2013 |

\* cited by examiner

FIG. 9A
FIG. 9B
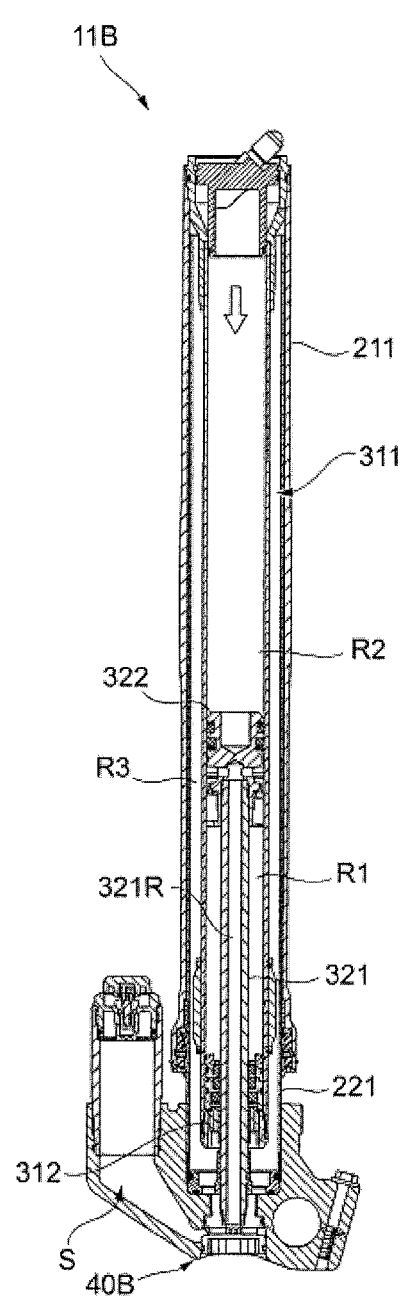
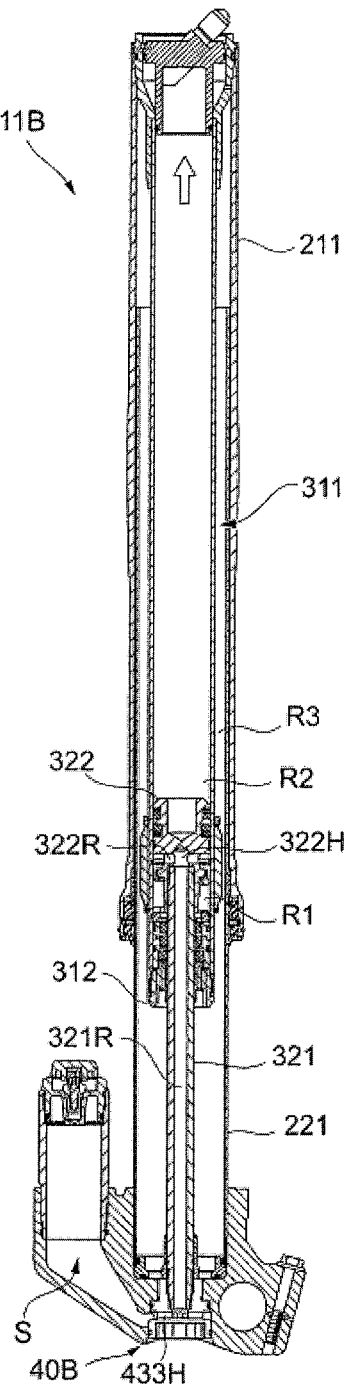

SUSPENSION DEVICE

CROSS-REFERENCE TO RELAYED APPLICATIONS

The present application claims priority under 35 U.S.C. § 119 to Japanese Patent Application No. 2016-042426, filed Mar. 4, 2016. The contents of this application are incorporated herein by reference in their entirety.

BACKGROUND

Field

The present disclosure relates to a suspension device.

Related Art

Japanese Unexamined Patent Application Publication No. 2012-92945 discloses a front fork in which a damper leg and a spring leg are disposed in parallel to each other. The spring leg includes a body-side tube and an axle-side tube inserted in each other. A guide cylinder is disposed in the center inside of one of the body-side tube and the axle-side tube. A guide rod is disposed in the center inside of the other of the body-side tube and the axle-side tube. A guide of the guide rod is inserted in the guide cylinder. An inner air spring chamber is defined in the guide cylinder by the guide of the guide rod. An outer air spring chamber is defined at least outside of the inner air spring chamber in the guide cylinder by the body-side tube and the axle-side tube.

Japanese Unexamined Patent Application Publication No. 2013-228089 discloses a spring leg of a front fork in which a sub-tank is disposed. The sub-tank includes an air chamber to communicate with a rebound air spring chamber.

SUMMARY

According to one aspect of the present disclosure, a suspension device is configured to couple a handlebar and a wheel of a vehicle to each other and includes a pair of suspensions each including at least one of a damping mechanism and a suspension spring. The pair of suspensions each includes a body-side member, a wheel-side member, a cylinder, a rod member, and a first defining member. The body-side member has a tubular shape and is located on a body side. The wheel-side member has a tubular shape and is located on a wheel side and coupled to the body-side member. The wheel-side member is configured to move relative to the body-side member in an axial direction of the body-side member. The cylinder of a hollow cylindrical shape is disposed inside of the body-side member and the wheel-side member and includes a weak portion in the axial direction on an outer side. The rod member is located inside of the body-side member and the wheel-side member and configured to move relatively in an axial direction of the cylinder in accordance with movement of the body-side member and the wheel-side member. The first defining member is secured to an end portion of the rod member and disposed in contact with the cylinder movably in the axial direction of the cylinder. The first defining member is configured to define space in the cylinder.

According to another aspect of the present disclosure, a suspension includes a body-side member, a wheel-side member, a cylinder, a rod member, a first defining member, a second defining member, and a third defining member. The body-side member has a tubular shape and is located on a body side. The wheel-side member has a tubular shape and is located on a wheel side and coupled to the body-side member. The wheel-side member is configured to move relative to the body-side member in an axial direction of the body-side member. The cylinder of a hollow cylindrical shape is disposed inside of the body-side member and the wheel-side member and includes a weak portion in the axial direction on an outer side. The rod member is located inside of the body-side member and the wheel-side member and configured to move relatively in an axial direction of the cylinder in accordance with movement of the body-side member and the wheel-side member. The first defining member is secured to an end portion of the rod member and disposed in contact with the cylinder movably in the axial direction of the cylinder. The first defining member is configured to define space in the cylinder and includes a damping mechanism configured to damp vibration generated by movement of the body-side member and the wheel-side member relative to each other. The second defining member is disposed on a side of the first defining member in the axial direction on which the cylinder is disposed. The second defining member is configured to define space in the cylinder and includes a damping mechanism. The third defining member is disposed on a side of the second defining member in the axial direction on which the cylinder is disposed. The third defining member is configured to define space in the cylinder and configured to move in the cylinder in the axial direction in accordance with movement of the rod member.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 9A and FIG. 9B respectively illustrate operations of the second front fork 11B at a compression stroke and at a rebound stroke;

DESCRIPTION OF THE EMBODIMENTS

Figure 1:
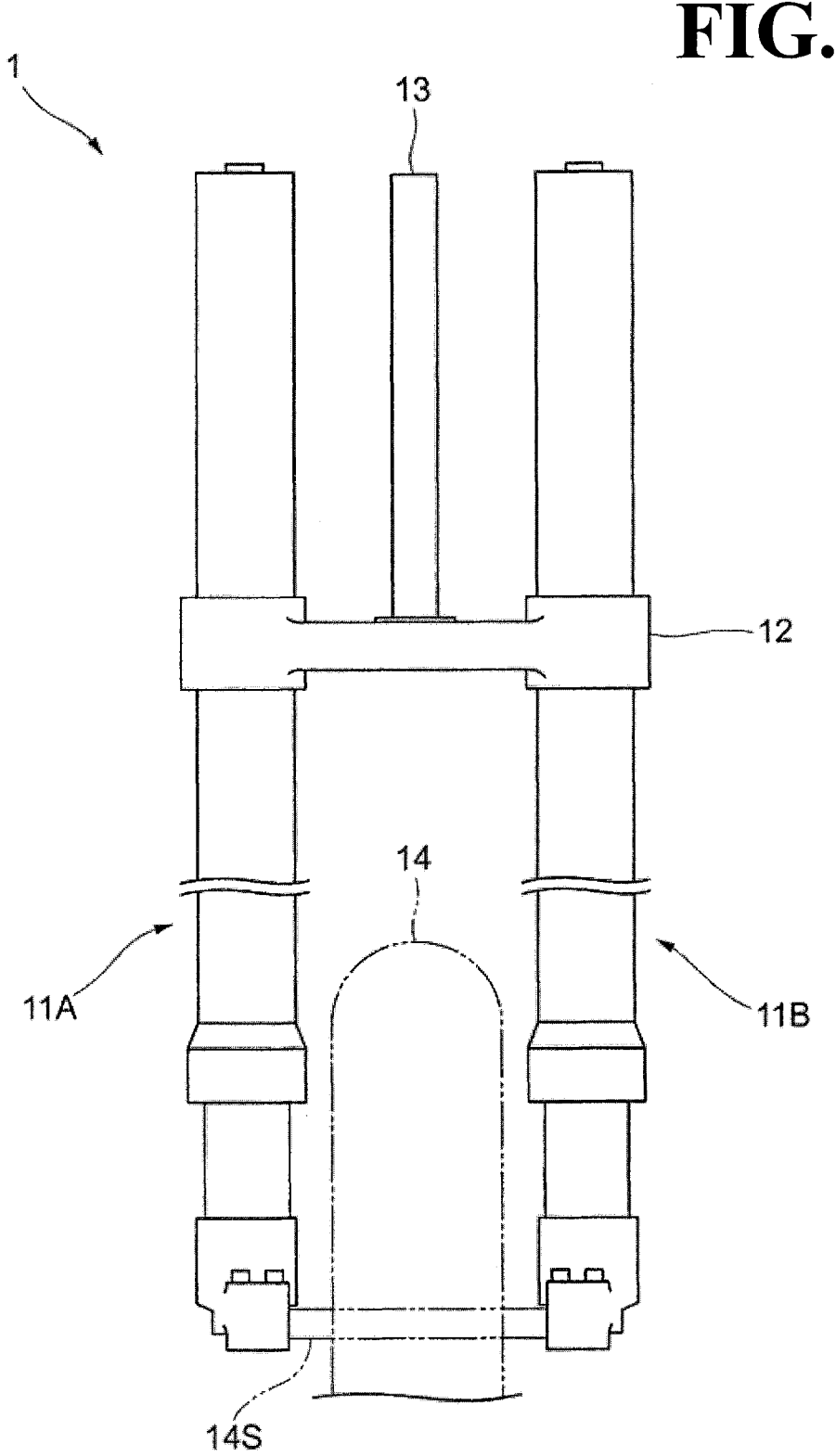
FIG. 1 is a whole view of a front fork in this embodiment.

The embodiments will now be described in detail with reference to the accompanying drawings, wherein like reference numerals designate corresponding or identical elements throughout the various drawings.

Whole Description of Front Fork

FIG. 1 is a whole view of a front fork 1 in this embodiment.

As illustrated in FIG. 1, the front fork 1 (suspension device) in this embodiment is an inverted front fork. The front fork 1 includes a first front fork 11A, a second front fork 11B, a bracket 12, and a steering shaft 13. The front fork 1 couples a handlebar (not illustrated) of a vehicle such as two-wheeled and three-wheeled vehicles and a wheel 14 of the vehicle to each other so as to damp impact and also transmit steering operation by the handlebar to the wheel 14.

The first front fork 11A and the second front fork 11B are respectively attached to the left and right of the wheel 14 through an axle 14S. The first front fork 11A and the second front fork 11B are expandable in the axial direction.

The first front fork 11A is an exemplary damper and contains a damping mechanism such as an oil damper and no suspension spring. In this embodiment, the second front fork 11B is an exemplary suspension spring device. The second front fork 11B does not contain, for example, a suspension spring made up of a damping mechanism and a metal spring but contains a suspension spring including an air spring. Both of the first front fork 11A and the second front fork 11B can be regarded as examples of the suspension.

The bracket 12 couples the first front fork 11A and the second front fork 11B to each other. The bracket 12 is coupled to the body of the vehicle. The steering shaft 13 has one end secured to the bracket 12 and the other end coupled to the handlebar.

The front fork 1 (suspension) in this embodiment includes the first front fork 11A (damper) and the second front fork 11B (suspension spring device). The first front fork 11A contains the damping mechanism and no suspension spring. The second front fork 11B contains the suspension spring and no damping mechanism. The front fork 1 couples the handlebar of the vehicle and the wheel 14 (wheel) to each other.

Configuration and Function of First Front Fork 11A

Figure 2:
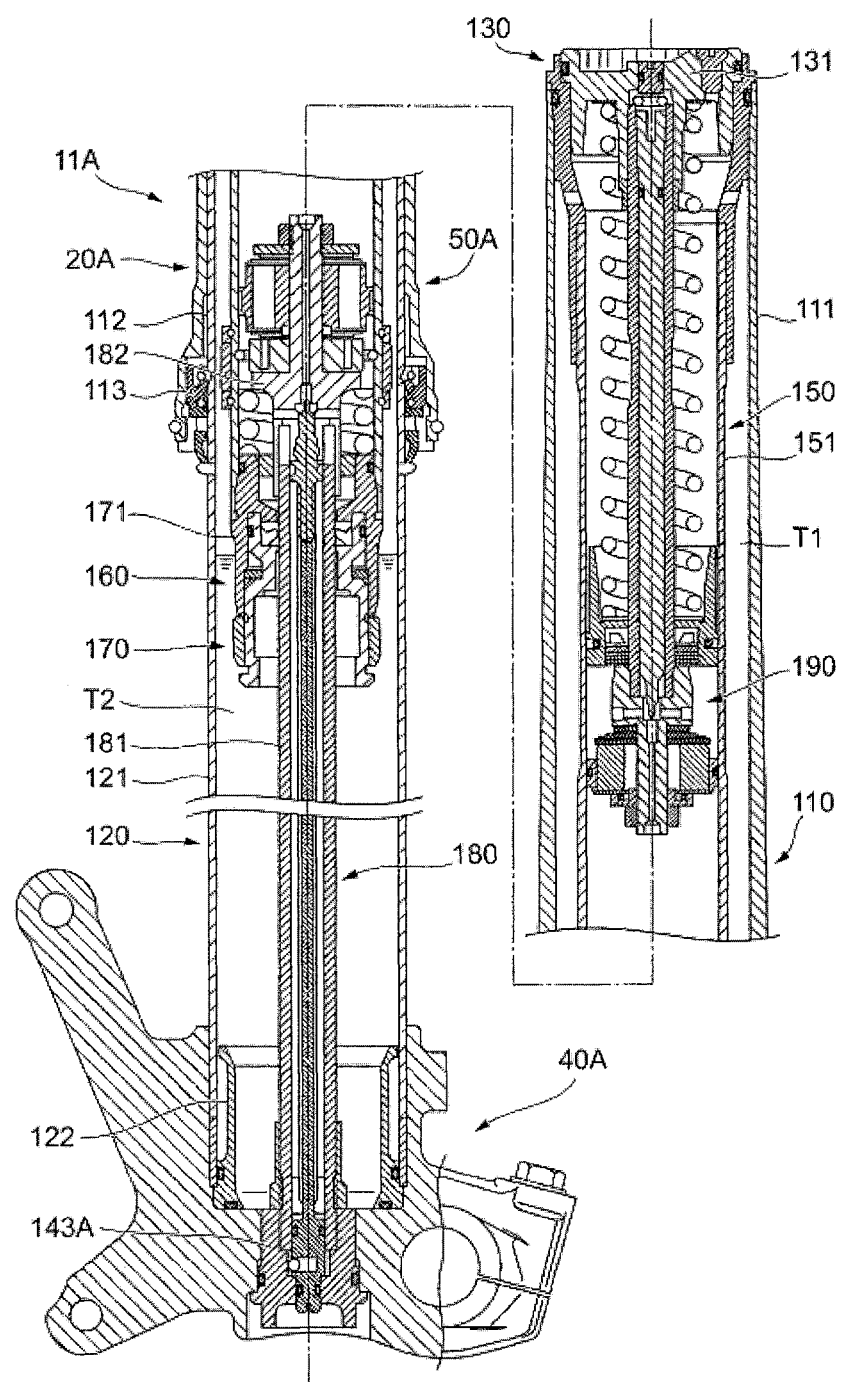
FIG. 2 illustrates a first front fork.

FIG. 2 illustrates the first front fork 11A.

Figure 3:
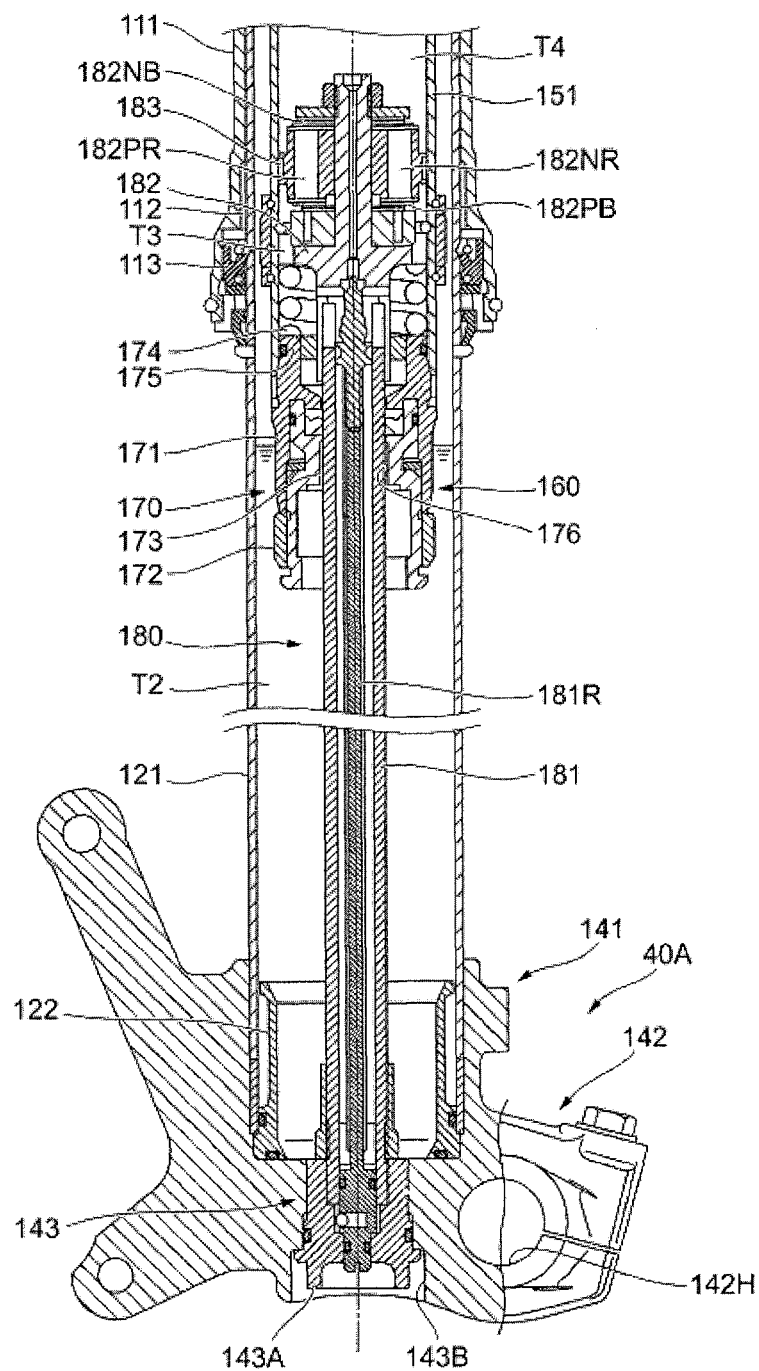
FIG. 3 is an enlarged view of the first front fork illustrated in FIG. 2 on the wheel side.

FIG. 3 is an enlarged view of the first front fork 11A illustrated in FIG. 2 on the wheel side.

Figure 4:
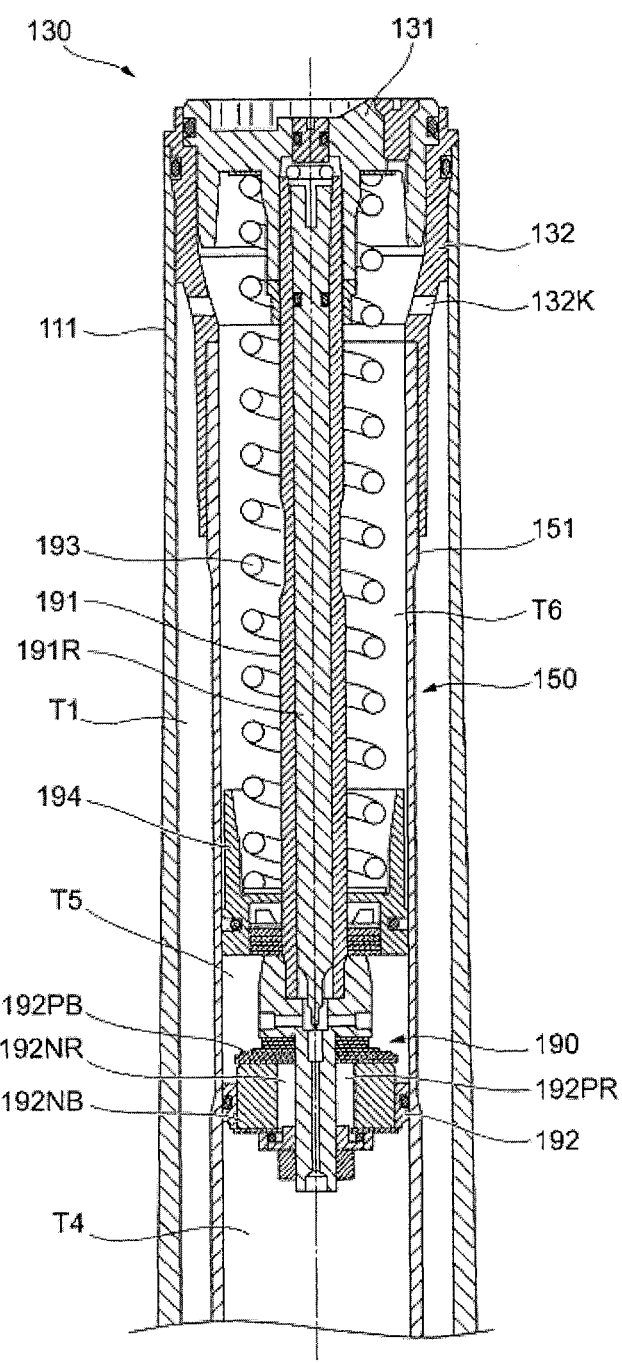
FIG. 4 is an enlarged view of the first front fork illustrated in FIG. 2 on the body side.

FIG. 4 is an enlarged view of the first front fork 11A illustrated in FIG. 2 on the body side.

The first front fork 11A (suspension, damper) includes an outer tube portion 110 (body-side member), an inner tube portion 120 (wheel-side member), a cylinder 151 (cylinder), a rod member 181 (rod member), and a piston 182 (first defining member). The outer tube portion 110 has a tubular shape and is located on the body side. The inner tube portion 120 has a tubular shape and is located on the wheel 14 (wheel) side and coupled to the outer tube portion 110. The inner tube portion 120 moves relative to the outer tube portion 110 in the axial direction of the outer tube portion 110. The cylinder 151 is disposed inside of the outer tube portion 110 and the inner tube portion 120. The cylinder 151 has a hollow cylindrical shape and includes a weak portion in the axial direction on the outer side. The rod member 181 is located inside of the outer tube portion 110 and the inner tube portion 120 and moves relative to the cylinder 151 in the axial direction of the cylinder 151 in accordance with movement of the outer tube portion 110 and the inner tube portion 120. The piston 182 is secured to an end portion of the rod member 181 and disposed in contact with the cylinder 151 movably in the axial direction of the cylinder 151 so as to define space in the cylinder 151.

From another point of view, the first front fork 11A (suspension, damper) includes an outer tube portion 110 (body-side member), an inner tube portion 120 (wheel-side member), a cylinder 151 (cylinder), a rod member 181 (rod member), a piston 182 (first defining member), a piston 192 (second defining member), and a free piston 194 (third defining member). The outer tube portion 110 has a tubular shape and is located on the body side. The inner tube portion 120 has a tubular shape and is located on the wheel 14 (wheel) side and coupled to the outer tube portion 110. The inner tube portion 120 moves relative to the outer tube portion 110 in the axial direction of the outer tube portion 110. The cylinder 151 is disposed inside of the outer tube portion 110 and the inner tube portion 120. The cylinder 151 has a hollow cylindrical shape and includes a weak portion in the axial direction on the outer side. The rod member 181 is located inside of the outer tube portion 110 and the inner tube portion 120 and moves relative to the cylinder 151 in the axial direction of the cylinder 151 in accordance with relative movement of the outer tube portion 110 and the inner tube portion 120. The piston 182 is secured to an end portion of the rod member 181 and disposed in contact with the cylinder 151 movably in the axial direction of the cylinder 151 so as to define space in the cylinder 151. The piston 182 includes a damping mechanism to damp vibration generated by relative movement of the outer tube portion 110 and the inner tube portion 120. The piston 192 is disposed on the side of the piston 182 in the axial direction on which the cylinder 151 is disposed. The piston 192 defines space in the cylinder 151 and includes a damping mechanism. The free piston 194 is disposed on the side of the piston 192 in the axial direction on which the cylinder 151 is disposed. The free piston 194 defines space in the cylinder 151, and moves in the cylinder 151 in the axial direction in accordance with movement of the rod member 181.

As illustrated in FIG. 2, the first front fork 11A includes an outer hollow cylindrical portion 20A, an axle bracket portion 40A, and a damper portion 50A. In this embodiment, it is noted that in the following description, the longitudinal direction of the first front fork 11A will be referral to as "axial direction". The end of the first front fork 11A on the wheel 14 side in the axial direction on which the axle bracket portion 40A is located will be referred to as "one end" whereas the end of the first front fork 11A on the opposite body side will be referred to as "other end". The same applies to the description of the second front fork 11B.

Outer Hollow Cylindrical Portion 20A

As illustrated in FIG. 2, the outer hollow cylindrical portion 20A includes the outer tube portion 110, the inner tube portion 120, and a fork bolt portion 130. The outer tube portion 110 is an example of the body-side member. The inner tube portion 120 is an example of the wheel-side member.

Outer Tube Portion 110

As illustrated in FIG. 2, the outer tube portion 110 includes an outer tube 111, a bush 112, and a seal member 113.

The outer tube 111 is a tubular member and located on the body side in this embodiment.

Inner Tube Portion 120

As illustrated in FIG. 2, the inner tube portion 120 includes an inner tube 121 and a bottom piece 122.

The inner tube 121 is a tubular member and located on the wheel 14 side in this embodiment. The inner tube 121 is coupled to the outer tube 111 and inserted in the outer tube 111, and moves relative to the outer tube 111 in the axial direction.

The bottom piece 122 is disposed on the one end side of the inner tube 121. The bottom piece 122 has an annular shape having an opening inside. The rod member 181 (described later) penetrates the opening.

Fork Bolt Portion 130

As illustrated in FIG. 4, the fork bolt portion 130 includes a fork bolt 131 and a cylinder holder 132.

The fork bolt 131 closes the other end side of the cylinder holder 132.

The cylinder holder 132 has a hollow cylindrical shape, and inserted and screw-fastened in the outer tube 111.

The cylinder holder 132 includes through holes 132K to communicate a gas chamber T1 and a gas chamber T6 behind the free piston 194, described later, with each other.

As described above, the first front fork 11A in this embodiment is an inverted front fork. Consequently, the outer tube 111 is arranged outside of the inner tube 121 in the radial direction.

Axle Bracket Portion 40A

As illustrated in FIG. 3, the axle bracket portion 40A includes a tube holder 141, an axle coupler 142, and a rod holder 143.

The inner diameter of the tube holder 141 is larger than the outer diameter of the inner tube 121. The one end of the inner tube 121 is inserted in the tube holder 141.

The axle coupler 142 includes an axle hole 142H in which the axle 14S (see FIG. 1) of the wheel 14 is inserted. The axle coupler 142 is capable of tightening the axle 14S of the wheel 14.

The rod holder 143 includes a bottom bolt 143A and a bottom bolt hole 143B. The bottom bolt hole 143B is connected to the bottom bolt 143A.

Damper Portion 50A

The damper portion 50A is an example of the damping mechanism. As illustrated in FIG. 2, the damper portion 50A includes a cylinder portion 150, a main valve device 160, and a sub-valve device 190. The main valve device 160 and the sub-valve device 190 generate damping force. The damper portion 50A uses the damping force to suppress compression-rebound vibration of the outer tube 111 and the inner tube 121 caused when the first front fork 11A absorbs impulsive force.

Cylinder Portion 150

As illustrated in FIG. 2, the cylinder portion 150 includes the cylinder 151.

The cylinder 151 is a hollow cylindrical member. In this embodiment, the cylinder 151 is located on the body side and disposed inside of the outer tube 111 and the inner tube 121. The cylinder 151 is inserted and screw-fastened in the cylinder holder 132 so as to be held. The cylinder 151 will be described in detail later.

The gas chamber T1 filled with air and an oil chamber T2 filled with oil are disposed between the outer tube 111 and the inner tube 121, and the cylinder 151. The air in the gas chamber T1 and the oil in the oil chamber T2 are in contact with each other through a free interface.

Main Valve Device 160

As illustrated in FIG. 3, the main valve device 160 includes a lower cylinder portion 170 and a rod portion 180.

Lower Cylinder Portion 170

As illustrated in FIG. 3, the lower cylinder portion 170 includes a rod guide 171, an oil lock collar 172, a bush 173, a rebound spring 174, and a spring bearing 175.

The rod guide 171 is located on the one end of the cylinder 151 and secured to the end portion of the cylinder 151. The rod member 181 (described later) penetrates a through hole 176 of the rod guide 171 and is held slidably in the axial direction.

The rod guide 171 defines the oil chamber T2 and a rod-side oil chamber T3.

The rebound spring 174 is, for example, a metal coil spring. Spring force of the rebound spring 174 acts to bias the outer tube 111 and the inner tube 121 in a compression direction.

Rod Portion 180

As illustrated in FIG. 3, the rod portion 180 includes the rod member 181, the piston 182, and a piston ring 183.

The rod member 181 is located on the wheel 14 side in this embodiment and is a rod-shaped member extending in the axial direction. The rod member 181 is hollow and has a rod inner chamber 181R formed inside. The rod inner chamber 181R is a through hole extending from one end to the other end of the rod member 181 in the axial direction.

The rod member 181 is secured to the axle bracket portion 40A through the bottom bolt 143A.

The rod member 181 is located inside of the outer tube 111 and the inner tube 121. The rod member 181 moves relative to the cylinder 151 in the axial direction of the cylinder 151 in accordance with movement of the outer tube 111 and the inner tube 121.

The piston 182 is an example of the first defining member including the damping mechanism. The piston 182 is located on an end portion of the rod member 181 on the other end side (end portion on the body side) and secured on the other end side of the rod member 181.

The piston 182 includes a rebound-side passage 182NR and a compression-side passage 182PR. The rebound-side passage 182NR includes a rebound-side damping valve 182NB and allows the rod-side oil chamber T3 and a piston-side oil chamber T4 to communicate with each other. The compression-side passage 182PR includes a compression-side check valve 182PB and allows the rod-side oil chamber T3 and the piston-side oil chamber T4 to communicate with each other.

The piston 182 is disposed in contact with the cylinder 151 movably in the axial direction of the cylinder 151 and defines space in the cylinder 151. That is, the piston 182 defines the space in the cylinder portion 150 into the rod-side oil chamber T3 that contains the rod member 181 and the piston-side oil chamber T4 that does not contain the rod member 181.

Sub-Valve Device 190

As illustrated in FIG. 4, the sub-valve device 190 includes a rod member 191, the piston 192, a pressurization spring 193, and the free piston 194.

The rod member 191 is a rod-shaped member extending in the axial direction. An end portion of the rod member 191 on the other end side is inserted and screw-fastened in the fork bolt 131. The rod member 191 is hollow and has a rod inner chamber 191R formed inside. The rod inner chamber 191R is a through hole extending from the other end to the one end of the rod member 191 in the axial direction.

The piston 192 is located and held on an end portion of the rod member 191 on the one end side. Thus, the piston 192 defines the piston-side oil chamber T4 and a sub-oil chamber T5.

The piston 192 includes a compression-side passage 192PR and a rebound-side passage 192NR. The compression-side passage 192PR includes a compression-side damping valve 192PB and allows the piston-side oil chamber T4 and the sub-oil chamber T5 to communicate with each other. The rebound-side passage 192NR includes a rebound-side check valve 192NB and allows the piston-side oil chamber T4 and the sub-oil chamber T5 to communicate with each other.

Thus, the piston 192 is disposed on the side of the piston 182 in the axial direction on which the cylinder 151 is disposed. The piston 192 defines space in the cylinder 151 and functions as the second defining member including the damping mechanism to damp vibration generated by relative movement of the outer tube portion 110 and the inner tube portion 120.

The pressurization spring 193 is a helical compression spring. The pressurization spring 193 biases the free piston 194 toward the piston 192.

The rod member 181 enters and moves away from the cylinder 151 in accordance with compression and rebound of the first front fork 11A. In order to compensate for the volume of the rod member 181 that enters and moves away from the cylinder 151, the free piston 194 slides in an inner portion of the cylinder 151 in a fluid tight manner.

The sub-oil chamber T5 communicates with the piston-side oil chamber T4 on the piston 192 side. With the above-described configuration, the free piston 194 defines the sub-oil chamber T5 and the gas chamber (volume compensation chamber) T6 behind the free piston 194.

The free piston 194 is disposed on the side of the piston 182 in the axial direction on which the cylinder 151 is disposed. The free piston 194 defines space in the cylinder 151 and functions as the third defining member to move in the cylinder 151 in the axial direction in accordance with movement of the rod member 181.

The first front fork 11A of the above-described configuration operates in the following manner.

Compression Stroke

In a compression stroke of the first front fork 11A, the outer tube 111 and the inner tube 121 move closer to each other relatively in the axial direction. At this time, the piston 182 and the lower cylinder portion 170 move away from each other relatively in the axial direction. The piston 182 and the piston 192 move closer to each other relatively in the axial direction.

When the piston 182 and the lower cylinder portion 170 move away from each other, the volume of the rod-side oil chamber T3 is increased. When the piston 182 and the piston 192 move closer to each other, the volume of the piston-side oil chamber T4 is decreased. Thus, oil in the piston-side oil chamber T4 forces open the compression-side check valve 182PB, passes the compression-side passage 182PR, and moves to the rod-side oil chamber T3.

At this time, the rod member 181 enters the rod-side oil chamber T3. Consequently, oil of a volume corresponding to the volume of the portion of the rod member 181 that has entered the rod-side oil chamber T3 moves from the piston-side oil chamber T4 to the sub-oil chamber T5. In this case, oil in the piston-side oil chamber T4 forces open the compression-side damping valve 192PB, passes the compression-side passage 192PR, and moves to the sub-oil chamber T5. At this time, damping force is further generated.

When the oil moves to the sub-oil chamber T5, the free piston 194 moves toward the other end side in the axial direction. This results in a decrease in the volume of the gas chamber T6. Gas of a volume corresponding to this decrease passes the through holes 132K and moves from the gas chamber T6 to the gas chamber T1.

Rebound Stroke

In a rebound stroke of the first front fork 11A, the outer tube 111 and the inner tube 121 move away from each other relatively in the axial direction. At this time, the piston 182 and the lower cylinder portion 170 move closer to each other relatively in the axial direction. The piston 182 and the piston 192 move away from each other relatively in the axial direction.

When the piston 182 and the lower cylinder portion 170 move closer to each other, the volume of the rod-side oil chamber T3 is decreased. When the piston 182 and the piston 192 move away from each other, the volume of the piston-side oil chamber T4 is increased. Thus, oil in the rod-side oil chamber T3 forces open the rebound-side damping valve 182NB, passes the rebound-side passage 182NR, and moves to the piston-side oil chamber T4. At this time, damping force is generated.

At this time, the rod member 181 moves away from the rod-side oil chamber T3. Consequently, oil of a volume corresponding to the volume of the portion of the rod member 181 that has moved out of the rod-side oil chamber T3 moves from the sub-oil chamber T5 to the piston-side oil chamber T4. In this case, oil in the sub-oil chamber T5 forces open the rebound-side check valve 192NB, passes the rebound-side passage 192NR, and moves to the piston-side oil chamber T4.

When the oil moves to the piston-side oil chamber T4, the free piston 194 moves toward the one end side in the axial direction. This results in an increase in the volume of the gas chamber T6. Gas of a volume corresponding to this increase passes the through holes 132K and moves from the gas chamber T1 to the gas chamber T6.

Configuration and Function of Second Front Fork 11B

Figure 5:
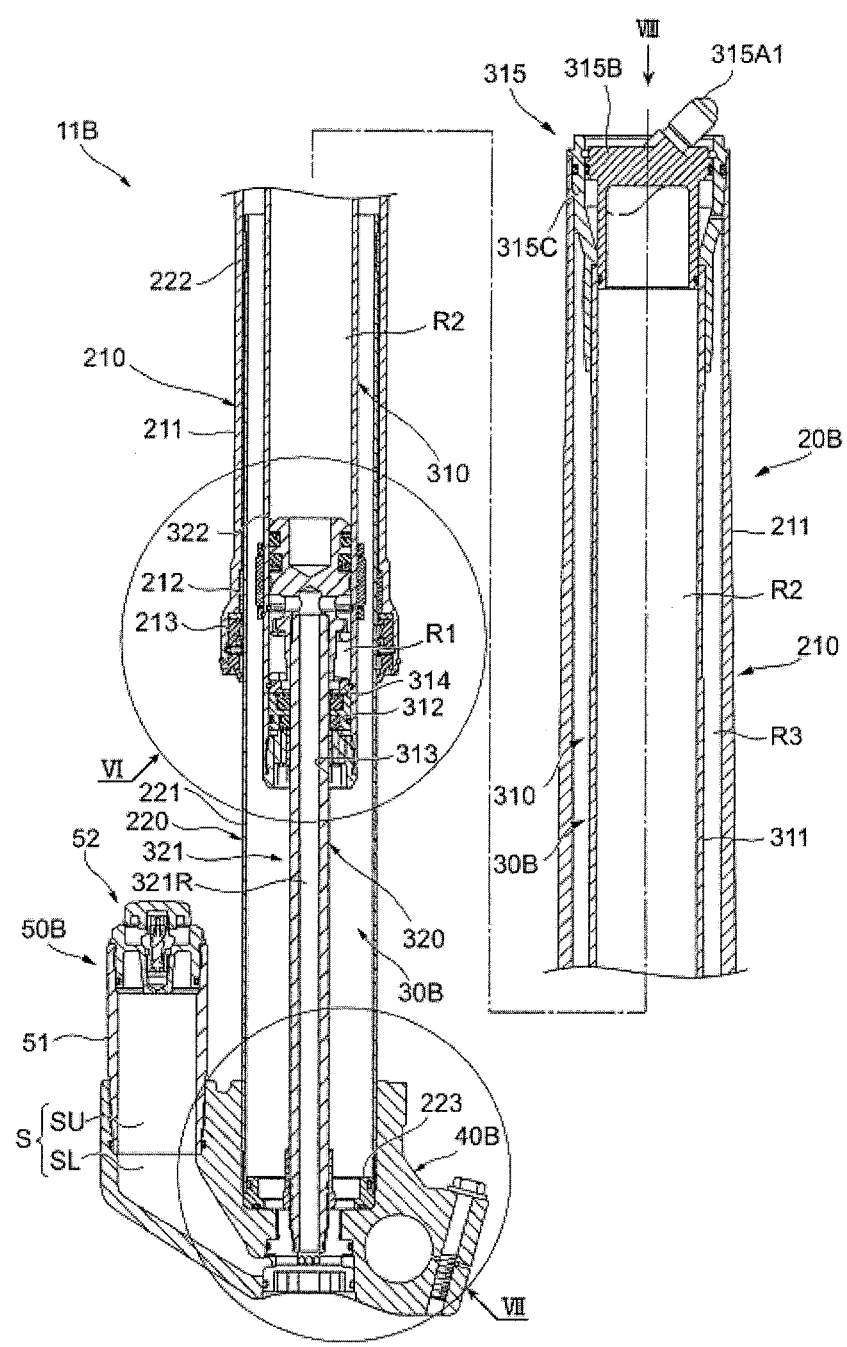
FIG. 5 illustrates a second front fork 11B.

FIG. 5 illustrates the second front fork 11B.

Figure 6:
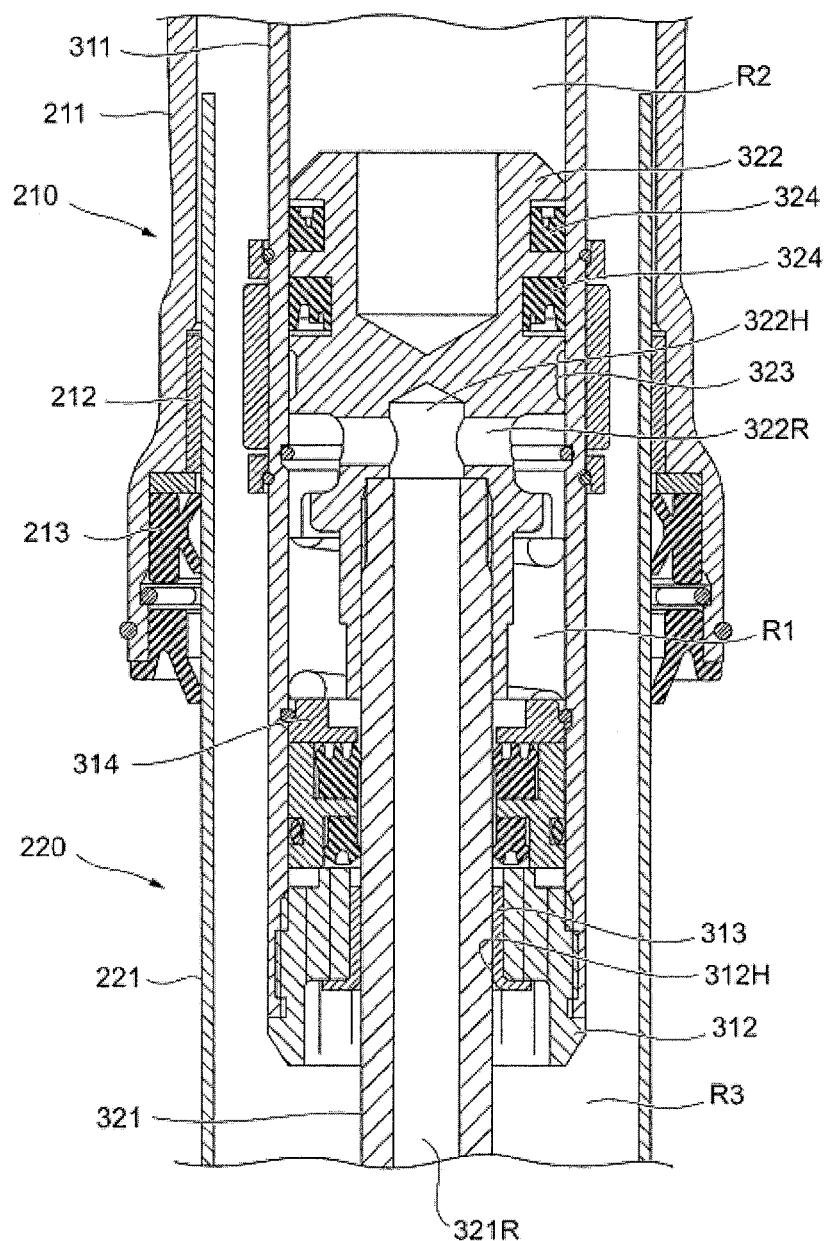
FIG. 6 is an enlarged view of part VI of the second front fork illustrated in FIG. 5.

FIG. 6 is an enlarged view of part VI of the second front fork 11B illustrated in FIG. 5.

Figure 7:
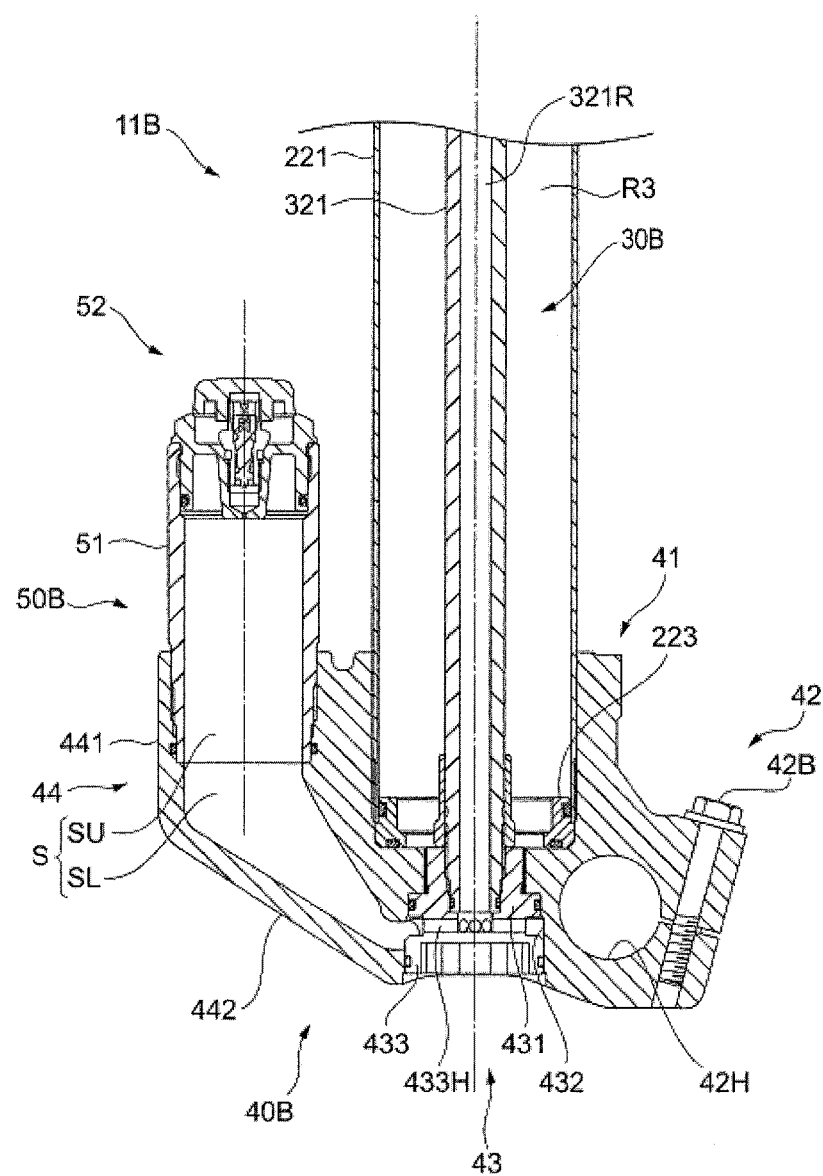
FIG. 7 is an enlarged view of part VII of the second front fork illustrated in FIG. 5.

FIG. 7 is an enlarged view of part VII of the second front fork 11B illustrated in FIG. 5.

Figure 8:
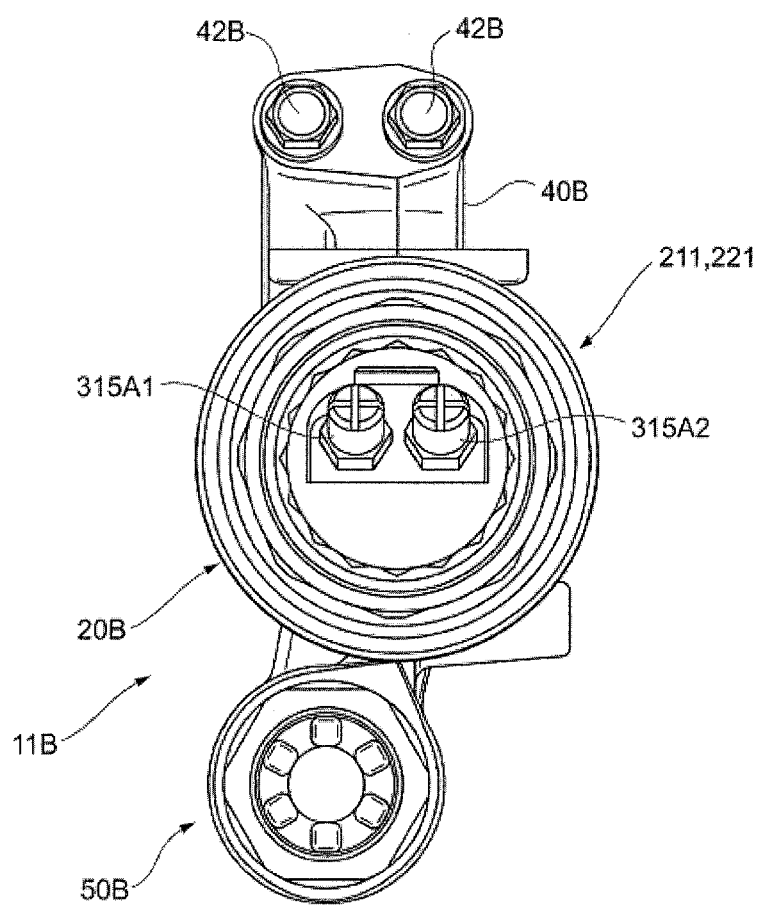
FIG. 8 is a view of the second front fork illustrated in FIG. 5, as viewed in a direction of arrow VIII.

FIG. 8 is a view of the second front fork 11B illustrated in FIG. 5, as viewed in a direction of arrow VIII.

The second front fork 11B (suspension, suspension spring device) includes an outer tube portion 210 (body-side member), an inner tube portion 220 (wheel-side member), a cylinder 311 (cylinder), a rod member 321 (rod member), and a piston 322 (first defining member). The outer tube portion 210 has a tubular shape and is located on the body side. The inner tube portion 220 has a tubular shape and is located on the wheel 14 (wheel) side and coupled to the outer tube portion 210. The inner tube portion 220 moves relative to the outer tube portion 210 in the axial direction of the outer tube portion 210. The cylinder 311 is disposed inside of the outer tube portion 210 and the inner tube portion 220. The cylinder 311 has a hollow cylindrical shape and includes a weak portion in the axial direction on an outer side. The rod member 321 is disposed inside of the outer tube portion 210 and the inner tube portion 220. The rod member 321 moves relative to the cylinder 311 in the axial direction of the cylinder 311 in accordance with movement of the outer tube portion 210 and the inner tube portion 220. The piston 322 is secured to an end portion of the rod member 321 and disposed in contact with the cylinder 311 movably in the axial direction of the cylinder 311. The piston 322 defines space in the cylinder 311.

As illustrated in FIG. 5, the second front fork 11B includes an outer hollow cylindrical portion 20B, an inner hollow cylindrical portion 30B, an axle bracket portion 40B, and a sub-tank portion 50B.

Outer Hollow Cylindrical Portion 20B

As illustrated in FIG. 5, the outer hollow cylindrical portion 20B includes the outer tube portion 210 and the inner tube portion 220. The outer tube portion 210 is an example of the body-side member. The inner tube portion 220 is an example of the wheel-side member.

Outer Tube Portion 210

The outer tube portion 210 includes an outer tube 211, a bush 212, and a seal member 213.

The outer tube 211 is a tubular member and is located on the body side in this embodiment.

Inner Tube Portion 220

As illustrated in FIG. 5, the inner tube portion 220 includes an inner tube 221, a bush 222, and a bottom piece 223.

The inner tube 221 is a tubular member and is located on the wheel 14 side in this embodiment. The inner tube 221 is inserted in the outer tube 211 and coupled to the outer tube 211. The inner tube 221 moves relative to the outer tube 211 in the axial direction.

As illustrated in FIG. 7, the bottom piece 223 is disposed on the one end side of the inner tube 221. The bottom piece 223 has an annular shape having an opening inside. The rod member 321 (described later) penetrates the opening.

As described above, the second front fork 11B in this embodiment is an inverted front fork. Consequently, the outer tube portion 210 is disposed outside of the inner tube portion 220 in the radial direction.

Inner Hollow Cylindrical Portion 30B

As illustrated in FIG. 5, the inner hollow cylindrical portion 30B includes a cylinder portion 310 and a rod portion 320.

Cylinder Portion 310

The cylinder portion 310 includes a cylinder 311, a rod guide 312, a bush 313, a stopper 314, and a fork bolt portion 315. The cylinder portion 310 forms an outer chamber R3 (third chamber) to accommodate gas between the outer tube 211 and the inner tube 221.

The cylinder 311 is disposed inside of the outer tube 211 and the inner tube 221 in the radial direction and has a hollow cylindrical shape. In this embodiment, the cylinder 311 is disposed on the body side, and inserted and screw-fastened inside of a cylinder holder 315C, described later, so as to be held. The cylinder 311 will be described in detail later.

As illustrated in FIG. 6, the rod guide 312 is located on an end portion of the cylinder 311 on the one end side and secured to the end portion of the cylinder 311. The rod guide 312 has a through hole 312H that the rod member 321 (described later) penetrates, and the rod member 321 is supported by the rod guide 312 slidably in the axial direction.

As illustrated in FIG. 5, the fork bolt portion 315 includes a fork bolt 315B and the cylinder holder 315C. As illustrated in FIG. 8, the fork bolt portion 315 further includes an inner gas-pressure adjustor 315A1 and an outer gas-pressure adjustor 315A2.

The fork bolt 315B closes the cylinder holder 315C on the other end side.

The cylinder holder 315C has a hollow cylindrical shape and is inserted and screw-fastened inside of the outer tube 211. The inner gas-pressure adjustor 315A1 communicates with an inner second chamber R2 (described later). The inner gas-pressure adjustor 315A1 basically hinders gas from flowing from the inside to the outside of the second front fork 11B. At the time of adjustment, the inner gas-pressure adjustor 315A1 makes the pressure of gas sealed in the inner second chamber R2 (described later) adjustable. The outer gas-pressure adjustor 315A2 communicates with the outer chamber R3. The outer gas-pressure adjustor 315A2 basically hinders gas from flowing from the inside to the outside of the second front fork 11B. At the time of adjustment, the outer gas-pressure adjustor 315A2 makes the pressure of gas sealed in the outer chamber R3 adjustable.

Rod Portion 320

As illustrated in FIG. 6, the rod portion 320 includes the rod member 321, the piston 322, a piston ring 323, and seal members 324.

The rod member 321 is a rod-shaped member extending in the axial direction. In this embodiment, the rod member 321 is secured on the inner tube 221 side. The rod member 321 is hollow and includes a rod inner chamber 321R (first space) formed inside. The rod inner chamber 321R is a through hole extending from the one end to the other end of the rod member 321 in the axial direction.

The rod member 321 is secured to the axle bracket portion 40B through a bottom bolt 431.

As illustrated in FIG. 6, the rod member 321 holds the piston 322 on the other end side. The inside of the rod member 321 is connected to a hole 322H (described later) of the piston 322 on the other end side of the rod inner chamber 321R. As described later, the rod inner chamber 321R of the rod member 321 communicates with an inner first chamber R1 through the hole 322H and a communication hole 322R. The inner first chamber R1 is a space defined by the cylinder 311, the rod member 321, the piston 322, and the rod guide 312 and functions as the second space.

The rod member 321 is located inside of the outer tube 211 and the inner tube 221 in the radial direction and moves relative to the cylinder 311 in the axial direction of the cylinder 311 in accordance with movement of the outer tube 211 and the inner tube 221.

As illustrated in FIG. 6, the piston 322 is held by the rod member 321. The piston 322 includes the hole 322H and the communication hole 322R.

The communication hole 322R has an opening on one side connected to the rod inner chamber 321R and an opening on the other side extending to an outer portion of the piston 322. The communication hole 322R communicates the rod inner chamber 321R and the inner first chamber R1, described later, with each other.

In this embodiment, the piston 322, the piston ring 323, and the seal members 324 define gas chambers in the cylinder 311. Specifically, the inner first chamber R1 (first chamber) is formed on the rod member 321 side, namely, on the one end side of the piston 322. The inner second chamber R2 (second chamber) is formed on the other end side of the piston 322.

The piston 322 is secured to an end portion of the rod member 321 on the body side and disposed in contact with the cylinder 311 movably in the axial direction of the cylinder 311 so as to function as the first defining member to define space in the cylinder 311.

Axle Bracket Portion 40B

As illustrated in FIG. 7, the axle bracket portion 40B includes a tube holder 41, an axle coupler 42, a rod holder 43, and a sub-tank attachment portion 44.

The tube holder 41 has an inner diameter approximately equal to the outer diameter of the inner tube 221, and an end portion of the inner tube 221 on the one end side is inserted in the tube holder 41.

The axle coupler 42 has an axle hole 42H in which the axle 14S (see FIG. 1) of the wheel 14 is inserted. The axle coupler 42 is capable of tightening the axle 14S of the wheel 14 by an axle bolt 42B.

The rod holder 43 includes a bottom bolt 431, a bottom bolt hole 432, and a cover 433.

The bottom bolt 431 has a thick, hollow cylindrical shape. The bottom bolt hole 432 is connected to the bottom bolt 431.

The cover 433 is located on an end portion of the rod holder 43 on the one end side and covers the bottom bolt 431. The cover 433 is secured inside of the bottom bolt hole 432. A communication hole 433H is formed in the cover 433. Through the communication hole 433H, the one end side of the rod member 321 and a lower tank chamber SL, described later, are connected to each other. That is, the communication hole 433H allows the rod inner chamber 321R and the lower tank chamber SL to communicate with each other.

The sub-tank attachment portion 44 includes a hollow cylindrical portion 441 and a connector 442.

The sub-tank portion 50B is attached and held to the hollow cylindrical portion 441 on the other end side.

The connector 442 connects a space in the sub-tank portion 50B, described later, with the communication hole 433H of the rod holder 43.

Sub-Tank Portion 50B

The sub-tank portion 50B is disposed outside of the outer tube 211 and the inner tube 221. As illustrated in FIG. 7, the sub-tank portion 50B includes a hollow cylindrical member 51 and a valve portion 52.

The hollow cylindrical member 51 has a hollow cylindrical shape and is held inside of the sub-tank attachment portion 44.

The valve portion 52 is disposed inside of the hollow cylindrical member 51.

The sub-tank portion 50B of this configuration forms an upper tank chamber SU (third space), which is a space inside of the hollow cylindrical member 51 and the valve portion 52. The upper tank chamber SU and a lower tank chamber SL (fourth space), which is a space inside of the connector 442, form a sub-tank chamber S.

As described above, the lower tank chamber SL communicates with the rod inner chamber 321R through the communication hole 433H. The rod inner chamber 321R further communicates with the inner first chamber R1 through the communication hole 322R and the hole 322H. That is, the inner first chamber R1, the rod inner chamber 321R, and the sub-tank chamber S are connected to each other in such a manner that gas flows among all these chambers.

The valve portion 52 basically hinders gas from flowing from the inside to the outside of the second front fork 11B. At the time of adjustment, the valve portion 52 makes the pressure of gas sealed in the inner first chamber R1 adjustable through the rod inner chamber 321R.

The second front fork 11B of the above-described configuration operates in the following manner.

FIGS. 9A and 9B illustrate operations of the second front fork 11B at a compression stroke and a rebound stroke.

Compression Stroke

In a compression stroke of the second front fork 11B, as illustrated in FIG. 9A, the outer tube 211 and the inner tube 221 move closer to each other relatively in the axial direction. The piston 322 and the rod member 321 move closer to the other end side of the cylinder 311 relatively in the axial direction.

When the outer tube 211 and the inner tube 221 move closer to each other, the volume of the outer chamber R3 is decreased to compress the air in the outer chamber R3. At this time, the outer chamber R3, which is sealed, functions as an air spring. Then, in the outer chamber R3, reaction force is generated in the direction to expand the outer tube 211 and the inner tube 221 relatively in the axial direction.

Similarly, when the piston 322 is inserted in the cylinder 311 toward the other end side, the volume of the inner second chamber R2 is decreased to compress the air in the inner second chamber R2. At this time, the inner second chamber R2, which is sealed, functions as an air spring. Then, in the inner second chamber R2 as well, reaction force is generated in the direction to expand the outer tube 211 and the inner tube 221 relatively in the axial direction.

Rebound Stroke

In a rebound stroke of the second front fork 11B, as illustrated in FIG. 9B, the outer tube 211 and the inner tube 221 move away from each other relatively in the axial direction. The piston 322 and the rod member 321 on the other end side move closer to the one end side of the cylinder 311 relatively in the axial direction.

When the piston 322 moves closer to the one end side of the cylinder 311, the piston 322 and the rod guide 312 move closer to each other relatively. Thus, the volume of the inner first chamber R1 is decreased to compress the air in the inner first chamber R1. The inner first chamber R1 is connected to the rod inner chamber 321R through the communication hole 322R and the hole 322H of the piston 322. The rod inner chamber 321R is connected to the sub-tank chamber S through the communication hole 433H. Consequently, the inner first chamber R1, the rod inner chamber 321R, and the sub-tank chamber S function as an air spring. Then, in the inner first chamber R1, the rod inner chamber 321R, and the sub-tank chamber S, reaction force is generated in the direction to compress the outer tube 211 and the inner tube 221 relatively in the axial direction.

In this embodiment, the rod inner chamber 321R and the sub-tank chamber S are provided in addition to the inner first chamber R1. This configuration makes the volume of the inner first chamber R1 larger than the conventional configuration so as to secure more stable reaction force.

As described above, in the second front fork 11B to which this embodiment is applied, at a compression stroke of the second front fork 11B, spring force of the air spring made up of the outer chamber R3 and the inner second chamber R2 is generated to bias the outer tube 211 and the inner tube 221 in the direction to expand the tubes relatively in the axial direction. At a rebound stroke of the second front fork 11B, spring force of the air spring made up of the inner first chamber R1 and other chambers is generated to bias the outer tube 211 and the inner tube 221 in the direction to compress the tubes relatively in the axial direction.

Cylinder 151 and Cylinder 311

Next, the cylinder 151 of the first front fork 11A and the cylinder 311 of the second front fork 11B will be described in detail.

Figure 10:
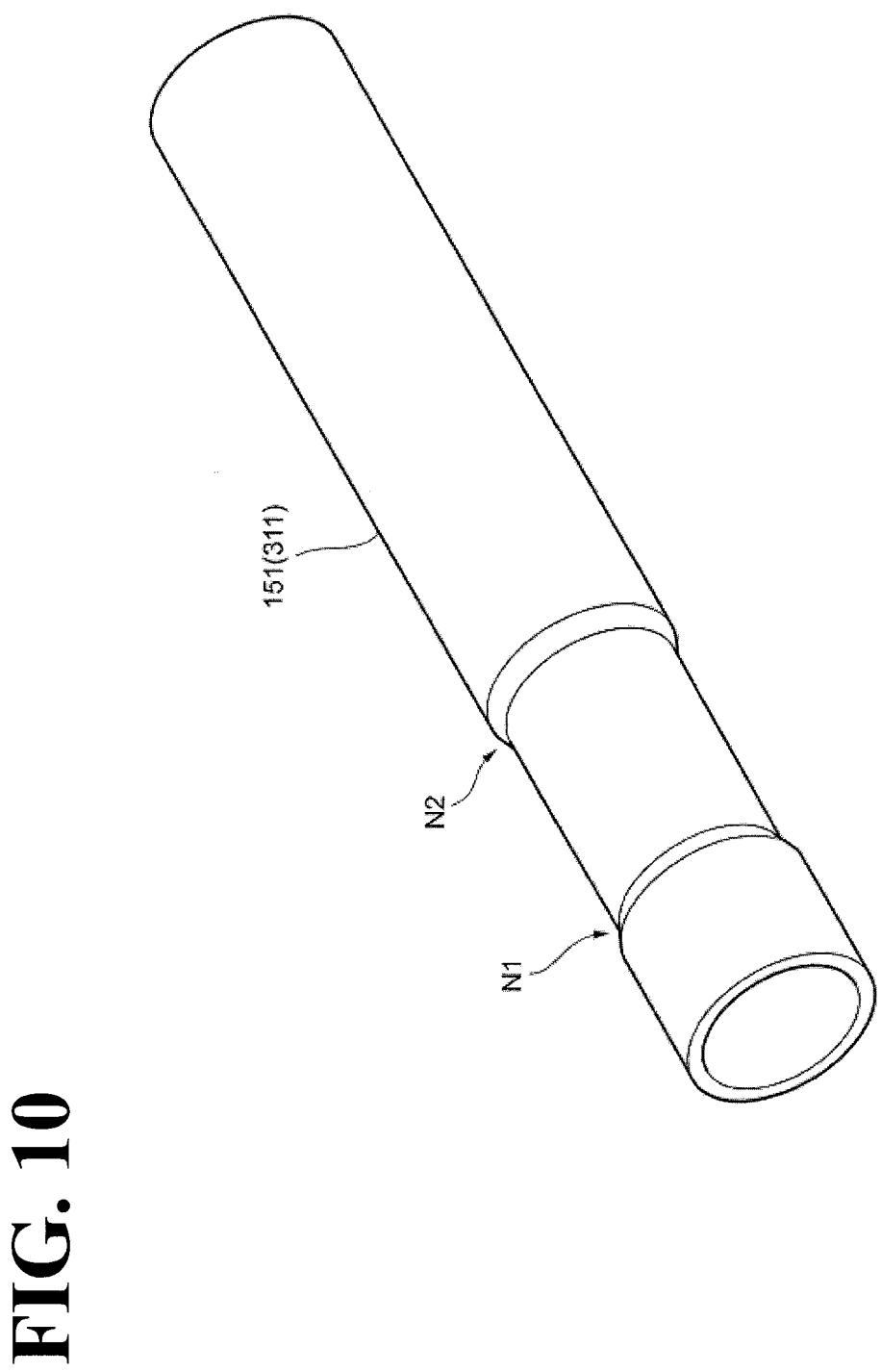
FIG. 10 is a perspective view of a cylinder.

FIG. 10 is a perspective view of the cylinder 151, 311.

Figure 11A:
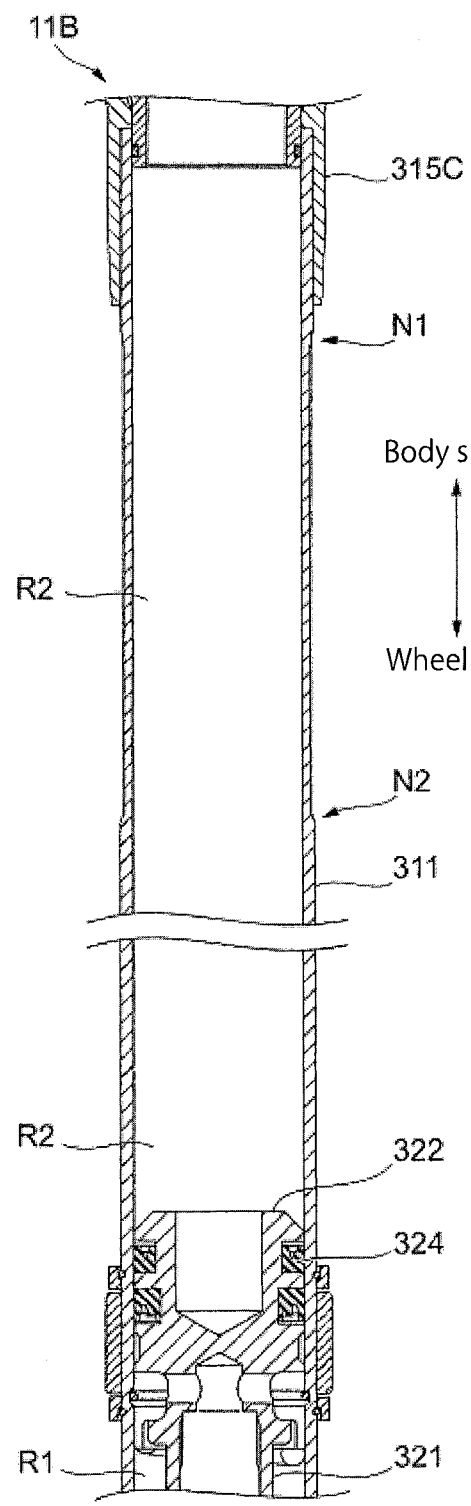
FIG. 11A illustrates a positional relationship of the cylinder, a cylinder holder, and a piston.
Figure 11B:
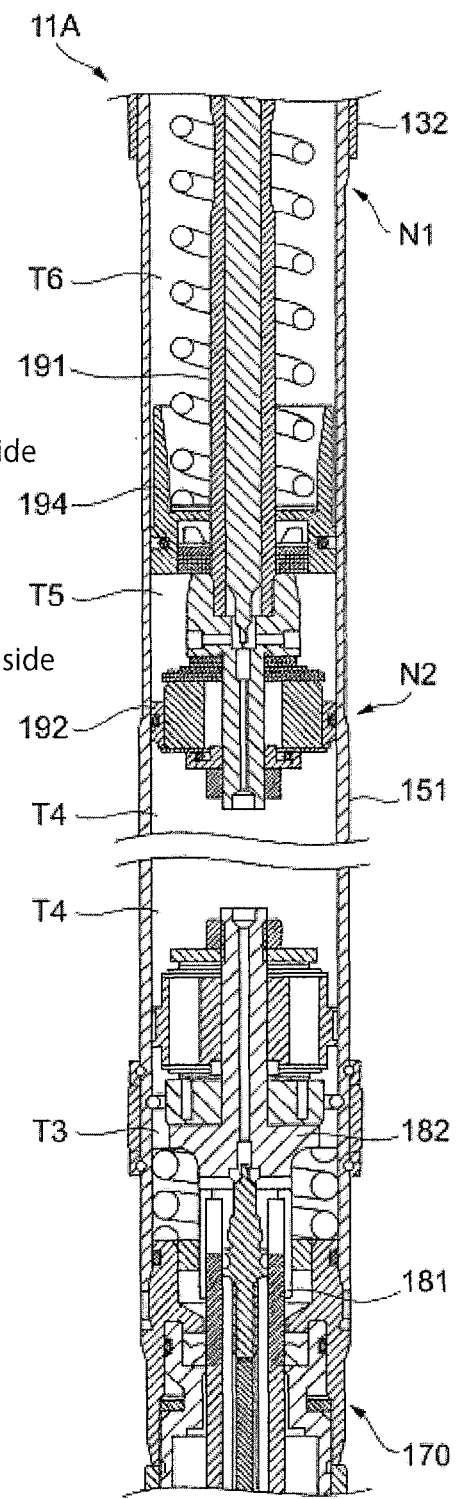
FIG. 11B illustrates a positional relationship of the cylinder, the cylinder holder, the piston, and a piston.

FIG. 11A illustrates a positional relationship of the cylinder 311, the cylinder holder 315C, and the piston 322. FIG. 11B illustrates a positional relationship of the cylinder 151, the cylinder holder 132, the piston 192, and the piston 182.

The cylinder 151, 311 includes the weak portion in the axial direction on the outer side. Specifically, for example, the cylinder 151, 311 has a portion having an outer diameter smaller than end portions, and this portion is regarded as the weak portion. In the illustrated example, the cylinder 151, 311 has the uniform inner diameter and includes the portion having the outer diameter smaller than the end portions in the axial direction. The "end portions" here refer to the end portions on the one end side and the other end side. In the illustrated example, the end portions refer to a range from position N1 to the other end side (body side) and a range from position N2 to the one end side (wheel 14 side). A portion of the cylinder 151, 311 other than the end portions is referral to as intermediate portion. In the illustrated example, the intermediate portion refers to a range from position N1 to position N2 in the axial direction. This configuration can be obtained by thinning, for example, cutting the outer surface of the cylinder, which originally has a hollow cylindrical shape, in the range from position N1 to position N2 in the axial direction.

In order to increase the pressure receiving area of the piston 322, the cylinder 311 has the same inner diameter, that is, the inner diameter of the cylinder 311 is approximately uniform from the one end side to the other end side. When a conventional cylinder having a larger inner diameter on the other end side and a smaller inner diameter on the one end side is used, the piston 322 is inserted on the side where the inner diameter is smaller, and accordingly, the piston 322 having a smaller diameter is used. That is, the pressure receiving area of the piston 322 is decreased. In order to secure spring force of the air spring, it is necessary to increase the pressure of air sealed in the inner second chamber R2. At this time, it is necessary for the seal members 324 to perform sealing against a higher air pressure. This increases protrusion of the seal members 324 toward the cylinder 311 side. As a result, friction between the seal members 324 and the cylinder 311 is increased to increase friction in operation of the second front fork 11B. This makes it difficult to perform flexible operation of the second front fork 11B.

In view of this, in this embodiment, the cylinder 311 has the uniform inner diameter so as to prevent the above-described problem. That is, the inner diameter of the cylinder 311 is larger on the one end side than the corresponding inner diameter of the conventional cylinder. In this case, the piston 322 having a larger diameter can be used. Accordingly, the pressure receiving area of the piston 322 is increased to decrease the pressure of air sealed in the inner second chamber R2. As a result, friction between the seal members 324 and the cylinder 311 is decreased to decrease friction in operation of the second front fork 11B. This facilitates flexible operation of the second front fork 11B. Since the pressure of the air sealed in the inner second chamber R2 can be decreased, the reaction force property becomes more linear.

When the inner diameter of the cylinder 311 is just made larger on the one end side, however, rigidity of the cylinder 311 becomes excessively large. As a result, it becomes more difficult for the second front fork 11B to bend, which is apt to degrade riding comfort of the vehicle. This further increases the weight of the second front fork 11B.

In view of this, in this embodiment, the cylinder 311 includes the portion of which the outer diameter is smaller than the end portions so as to prevent the above-described problem. Specifically, the intermediate portion of the cylinder 311 other than the end portions has a smaller thickness. Consequently, even when the inner diameter of the cylinder 311 is made larger on the one end side, rigidity of the cylinder 311 does not largely vary. As a result, the rigidity does not become excessively large, which makes the second front fork 11B bend more flexibly to improve riding comfort of the vehicle. That is, while the rigidity is increased, improved riding comfort can be secured. Moreover, this configuration prevents the weight of the second front fork 11B from increasing.

In the first front fork 11A on the damper side, this kind of problem about the inner diameter is not likely to occur. In this embodiment, however, the cylinder 151 of the first front fork 11A has approximately the same configuration as the cylinder 311. This is because the first front fork 11A and the second front fork 11B are made to have the same rigidity. That is, if the cylinder 151 and the cylinder 311 do not have the same configuration, the first front fork 11A and the second front fork 11B have different rigidity. As a result, in riding the vehicle, the first front fork 11A and the second front fork 11B have different bending flexibility, which is apt to degrade steerability of the vehicle. Therefore, the first front fork 11A and the second front fork 11B are made to have the same rigidity so as not to degrade steerability of the vehicle.

Concerning the outer diameter of the cylinder 151, preferably, the outer diameter is not made smaller on the side of the piston 192 in the axial direction on which the rod member 181 is disposed, and the outer diameter is made smaller on the side of the piston 192 in the axial direction on which the cylinder 151 is disposed. In the illustrated example, the side of the piston 192 where the rod member 181 is disposed is from position N2 to the one end side (wheel 14 side). The side of the piston 192 where the cylinder 151 is disposed is from position N to the other end side (body side).

This is because the pressure in the range from position N2 to the one end side tends to be higher than the pressure in the range from position N2 to the other end side. Specifically, as described above, at a compression stroke of the first front fork 11A, the piston 182 and the piston 192 move closer to each other to decrease the volume of the piston-side oil chamber T4. At this time, a high pressure is applied to the piston-side oil chamber T4. The portion where the piston-side oil chamber T4 is disposed is from position N to the one end side. Consequently, when the outer diameter of this portion of the cylinder 151 is made smaller to decrease the thickness of the cylinder 151, the cylinder 151 is apt to expand to degrade the seal property by the piston 182 and the piston 192. In this case, the function of the first front fork 11A as the damper is degraded. Therefore, preferably, the cylinder 151 is not made thinner in the portion where the piston-side oil chamber T4 is disposed. For this reason, the outer diameter of the cylinder 151 is not made smaller from position N2 to the one end side, and the outer diameter of the cylinder 151 is made smaller from position N2 to the other end side.

In other words, the cylinder 151 has a smaller outer diameter in the portion other than the movable range of the piston 182 (from position N2 to the one end side (wheel side)). Also, in other words, since the piston 182 moves in the range from position N2 of the cylinder 151 to the one end side (wheel side), the cylinder 151 has the smaller outer diameter in the portion of the cylinder 151 on the other end side (body side). Further, in other words, the cylinder 151 has the smaller outer diameter on the side of the piston 192 in the axial direction on which the cylinder 151 is disposed (from position N2 to the other end side (body side)).

Concerning the outer diameter of the cylinder 151, preferably, the outer diameter in the portion that is held by the cylinder holder 132 in the axial direction is not made smaller. In the illustrated example, the portion of the cylinder 151 that is held by the cylinder holder 132 is from position N1 to the other end side (body side). This prevents a gap between the cylinder holder 132 and the cylinder 151.

In the cylinder 311 of the second front fork 11B, these problems about the outer diameter rarely occur. As described above, however, in order to make the first front fork 11A and the second front fork 11B have the same rigidity, the cylinder 311 is the same as the cylinder 151 in outer diameter. That is, the first front fork 11A and the second front fork 11B have a uniform inner diameter and have a smaller outer diameter in the same portion.

In the above-described example, the cylinder 151 and the cylinder 311 have the same configuration. This, however, should not be construed in a strict sense. For example, insofar as the rigidity is not affected, the cylinder 151 and the cylinder 311 may have different configurations. Specifically, surface processing of the cylinder 151 and the cylinder 311 may be different.

In the above-described example, the cylinder 151 and the cylinder 311 have a uniform inner diameter and include the portion that have a smaller outer diameter than the end portions. This, however, does not exclude an idea of, for example, increasing or decreasing the inner diameter and the outer diameter in end portions to couple the cylinder 151 and the cylinder 311 to other members. In this case, it is a matter of course that portions to prescribe the inner diameter and the outer diameter of the cylinder 151 and the cylinder 311 do not include such end portions.

In the above-described example, the weak portion of the outer portion of the cylinder 151, 311 is the portion having a smaller outer diameter than the end portions. This, however, should not be construed in a limiting sense. For example, the outer portion of the cylinder 151, 311 may be subjected to surface processing to provide the weak portion. In this case, although the outer diameter is uniform in the axial direction, surface processing makes the portion weak. Alternatively, both of forming the portion having a smaller outer diameter than the end portions and surface processing may be used to provide the weak portion.

In the above-described example, the first front fork 11A (damper) contains the damping mechanism and no suspension spring, and the second front fork 11B (suspension spring device) contains the suspension spring and no damping mechanism. This, however, should not be construed in a limiting sense. This embodiment is applicable insofar as each of a pair of front forks (suspensions) contains at least one of the damping mechanism and the suspension spring. For example, this embodiment is applicable to a general front fork including both of the damping mechanism and the suspension spring.

Friction and Reaction Force Property

Figure 12A:
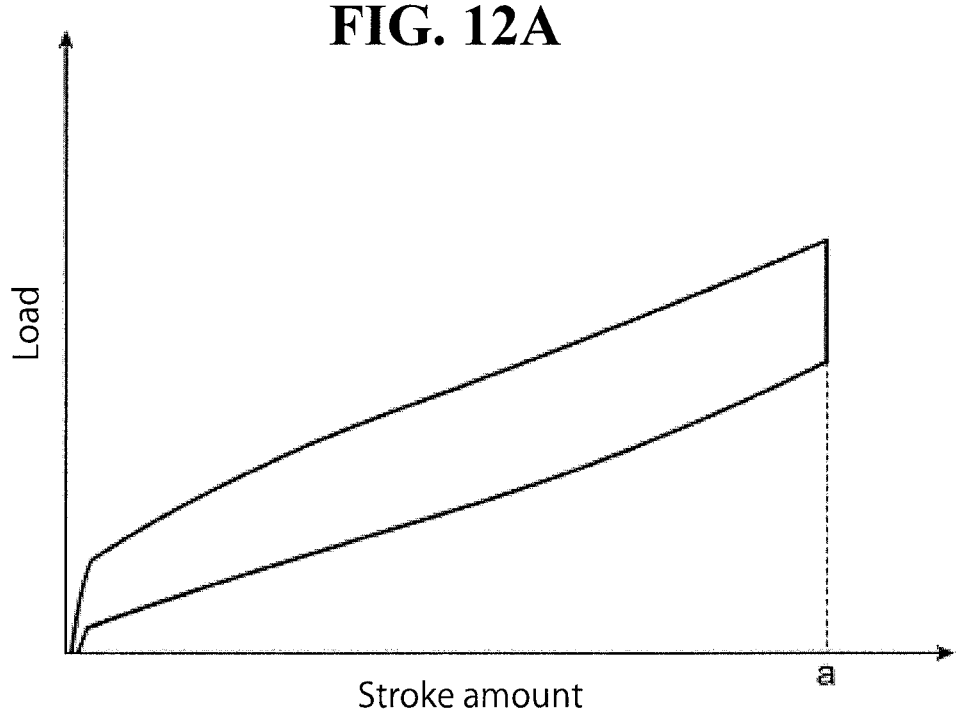
FIG. 12A and FIG. 12B are graphs for comparing reaction force properties of the second front fork, which is a damper, when a configuration of the cylinder in this embodiment is not adopted and when the configuration of the cylinder in this embodiment is adopted.
Figure 12B:
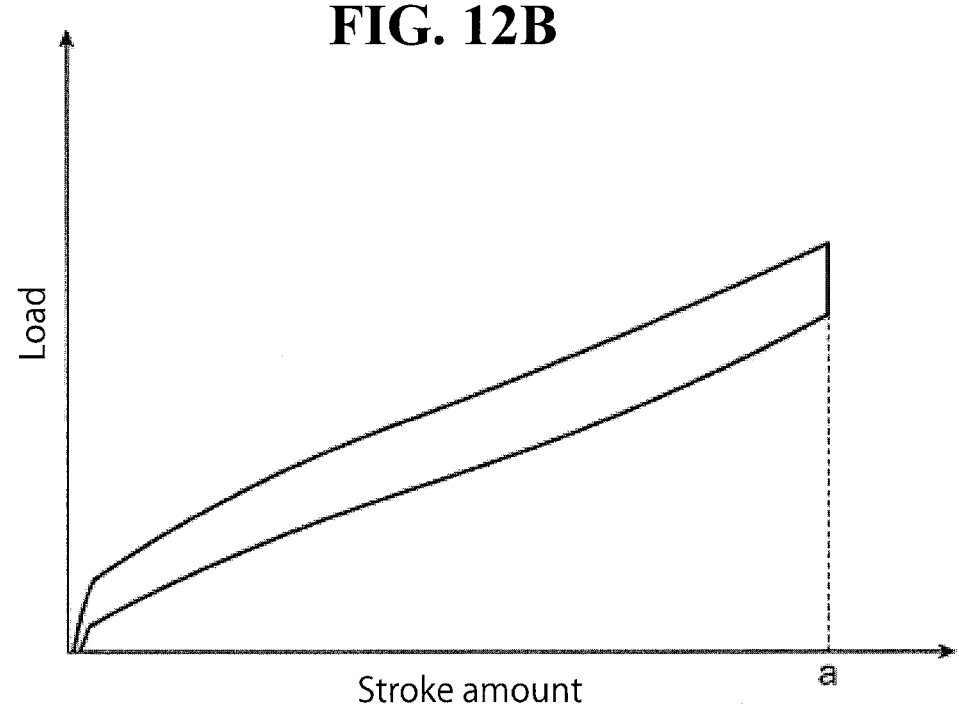

FIG. 12A and FIG. 12B are graphs for comparing reaction force properties of the second front fork 11B, which is the suspension spring device, when the configuration of the cylinder 311 in this embodiment is not used and used. In FIGS. 12A and 12B, the axis of abscissas represents the stroke amount, and the axis of ordinates represents the load.

FIG. 12A illustrates a reaction force property when the configuration of the cylinder 311 in this embodiment is not used, and FIG. 12B illustrates a reaction force property when the configuration of the cylinder 311 in this embodiment is used. When the configuration of the cylinder 311 in this embodiment is not used, the above-described conventional cylinder is used. The conventional cylinder has an inner diameter that is larger on the other end side and smaller on the one end side.

When the pressure in the piston-side oil chamber T4 on the side of the first front fork 11A, which is the damper, is increased similarly, friction increases. Also, a factor such as heat causes a pressure change. This causes a friction change similar to the friction change of the second front fork 11B. Consequently, in order to suppress expansion of a sliding portion (moving portion) of the piston 182 of the cylinder 151, it is effective to increase the inner diameter of the cylinder and providing the portion having a smaller outer diameter in a similar manner to the second front fork 11B.

The graphs illustrate relationships between stroke amounts and loads. In the graphs, from a state in which the stroke amount is 0, the load is gradually increased to compress the second front fork 11B until the stroke amount becomes "a", and then, the load is gradually decreased until the stroke amount returns to 0.

As illustrated in the graphs, the reaction force property describes an approximate parallelogram loop. As the friction increases, the area of this approximate parallelogram increases. As the friction decreases, the area of the approximate parallelogram decreases.

When FIG. 12A and FIG. 12B are compared with each other, the area of the approximate parallelogram is smaller in the case of FIG. 12B than in the case of FIG. 12A. This shows that the friction is smaller when the configuration of the cylinder 311 in this embodiment is used.

Figure 13A:
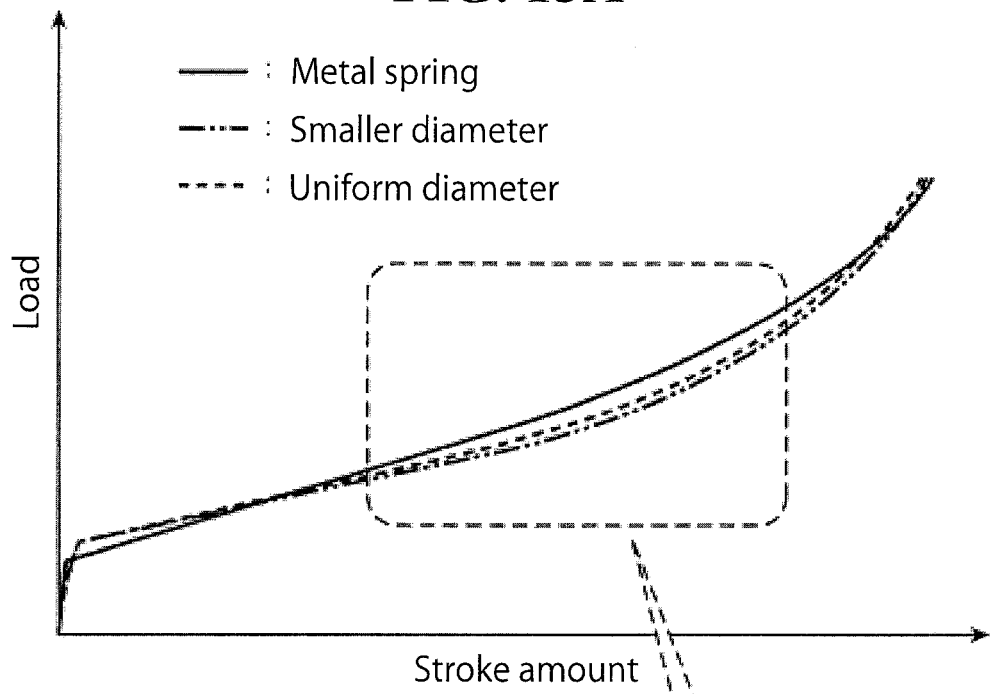
FIG. 13A and FIG. 13B are respectively a graph and an enlarged view for comparing reaction force properties when the second front fork is compressed from the most expanded state by gradually increasing the load until the stroke amount becomes "a".
Figure 13B:
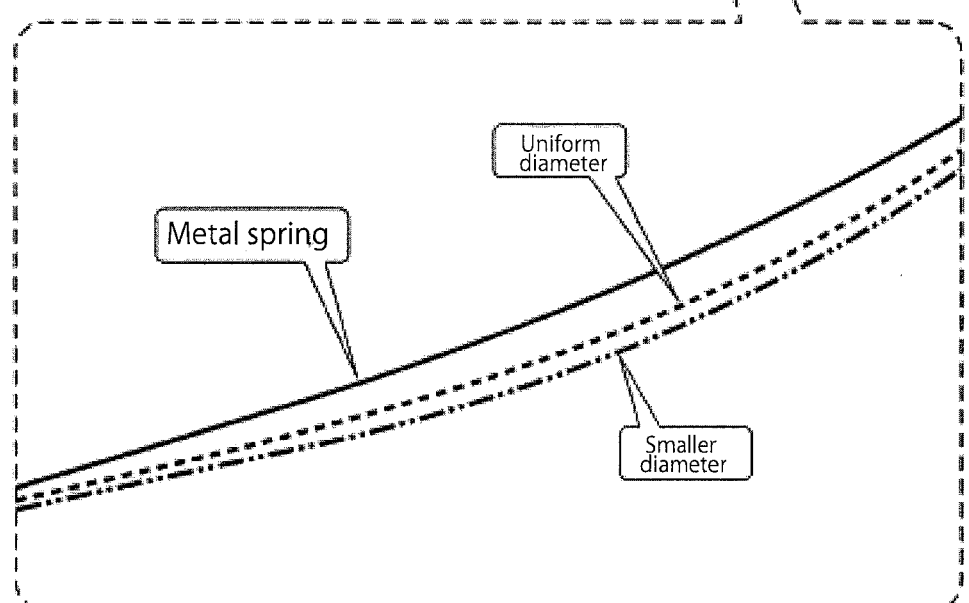

FIG. 13A and FIG. 13B are a graph and an enlarged view for comparing reaction force properties, in which from a maximum expansion state, the load is gradually increased to compress the second front fork 11B until the stroke amount becomes "a".

In FIG. 13A, reaction force properties are compared concerning the second front fork 11B in which the configuration of the cylinder 311 in this embodiment is not used, the second front fork 11B in which the configuration of the cylinder 311 in this embodiment is used, and a suspension in which a metal spring is used. FIG. 13B is a partial, enlarged view of FIG. 13A.

FIGS. 13A and 13B show that the reaction force property when the configuration of the cylinder 311 in this embodiment is used (indicated by "uniform diameter") is closer to the reaction force property of the suspension in which the metal spring is used (indicated by "metal spring") than the reaction force property when the configuration of the cylinder 311 in this embodiment is not used (indicated by "smaller diameter") is to the reaction force property of the suspension in which the metal spring is used. The reaction force property when the configuration of the cylinder 311 in this embodiment is used is more linear.

When the inner diameter of the cylinder is, for example, larger on the body side and smaller on the wheel side, a sufficient pressure-receiving area of the piston cannot be secured. As a result, the pressure in space compressed by the piston is apt to increase, which makes friction of the suspension worse. Alternatively, when the cylinder has the same inner diameter on the body side and on the wheel side, rigidity of the cylinder tends to become excessively large. This makes the suspension less flexible, which unfortunately degrade riding comfort of the vehicle.

The embodiment provides the suspension device in which even though the cylinder has the uniform inner diameter on the body side and on the wheel side, rigidity of the damper can be increased, and riding comfort of the vehicle can be also secured.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A suspension device configured to couple a handlebar and a wheel of a vehicle to each other and comprising a pair of suspensions each comprising at least one of a damping mechanism and a suspension spring, the pair of suspensions each comprising:
   a body-side member that has a tubular shape and is located on a body side;
   a wheel-side member that has a tubular shape and is located on a wheel side and coupled to the body-side member, the wheel-side member being configured to move relative to the body-side member in an axial direction of the body-side member;
   a cylinder of a hollow cylindrical shape that is disposed inside of the body-side member and the wheel-side member and comprises a weak portion in the axial direction on an outer side of the cylinder;
   a rod member that is located inside of the body-side member and the wheel-side member and configured to move relatively in an axial direction of the cylinder in accordance with movement of the body-side member and the wheel-side member;
   a first defining member that is secured to an end portion of the rod member and disposed in contact with the cylinder movably in the axial direction of the cylinder, the first defining member being configured to define space in the cylinder; and
   a cylinder holder whose distal end is disposed in the body-side member, wherein
   the weak portion is located further on the wheel side than the distal end of the cylinder holder and is configured to reduce a rigidity of the cylinder.

2. The suspension device according to claim 1, wherein the cylinder comprises the weak portion in a position other than a movable range of the first defining member.

3. The suspension device according to claim 2, wherein the cylinder is disposed on the body side and comprises the weak portion in a position on the body side of the cylinder.

4. The suspension device according to claim 3, wherein the weak portion of the cylinder is in a position where the cylinder comprises a smaller outer diameter than end portions of the cylinder.

5. The suspension device according to claim 4, wherein the pair of suspensions comprise a uniform inner diameter and comprise portions that have a smaller outer diameter in a same position in the axial direction.

6. The suspension device according to claim 3, further comprising a second defining member disposed on a side of the first defining member in the axial direction on which the cylinder is disposed, the second defining member being configured to define space in the cylinder and comprising a second damping mechanism configured to damp vibration generated by movement of the body-side member and the wheel side member relative to each other,
   wherein the first defining member comprises a first damping mechanism, and
   wherein the cylinder comprises the weak portion on a side of the second defining member in the axial direction on which the cylinder is disposed and on the outer side of the cylinder.

7. The suspension device according to claim 2, wherein the weak portion of the cylinder is in a position where the cylinder comprises a smaller outer diameter than end portions of the cylinder.

8. The suspension device according to claim 7, wherein the pair of suspensions comprise a uniform inner diameter and comprise portions that have a smaller outer diameter in a same position in the axial direction.

9. The suspension device according to claim 2, further comprising a second defining member disposed on a side of the first defining member in the axial direction on which the cylinder is disposed, the second defining member being configured to define space in the cylinder and comprising a second damping mechanism configured to damp vibration generated by movement of the body-side member and the wheel side member relative to each other,
   wherein the first defining member comprises a first damping mechanism, and
   wherein the cylinder comprises the weak portion on a side of the second defining member in the axial direction on which the cylinder is disposed and on the outer side of the cylinder.

10. The suspension device according to claim 1, wherein the cylinder is disposed on the body side and comprises the weak portion in a position on the body side of the cylinder.

11. The suspension device according to claim 10, wherein the weak portion of the cylinder is in a position where the cylinder comprises a smaller outer diameter than end portions of the cylinder.

12. The suspension device according to claim 11, wherein the pair of suspensions comprise a uniform inner diameter and comprise portions that have a smaller outer diameter in a same position in the axial direction.

13. The suspension device according to claim 10, further comprising a second defining member disposed on a side of the first defining member in the axial direction on which the cylinder is disposed, the second defining member being configured to define space in the cylinder and comprising a second damping mechanism configured to damp vibration generated by movement of the body-side member and the wheel side member relative to each other,
   wherein the first defining member comprises a first damping mechanism, and
   wherein the cylinder comprises the weak portion on a side of the second defining member in the axial direction on which the cylinder is disposed and on the outer side of the cylinder.

14. The suspension device according to claim 1, wherein the weak portion of the cylinder is in a position where the cylinder comprises a smaller outer diameter than end portions of the cylinder.

15. The suspension device according to claim 14, wherein the pair of suspensions comprise a uniform inner diameter and comprise portions that have a smaller outer diameter in a same position in the axial direction.

16. The suspension device according to claim 15, further comprising a second defining member disposed on a side of the first defining member in the axial direction on which the cylinder is disposed, the second defining member being configured to define space in the cylinder and comprising a second damping mechanism configured to damp vibration generated by movement of the body-side member and the wheel side member relative to each other,
   wherein the first defining member comprises a first damping mechanism, and
   wherein the cylinder comprises the weak portion on a side of the second defining member in the axial direction on which the cylinder is disposed and on the outer side of the cylinder.

17. The suspension device according to claim 14, further comprising a second defining member disposed on a side of the first defining member in the axial direction on which the cylinder is disposed, the second defining member being configured to define space in the cylinder and comprising a second damping mechanism configured to damp vibration generated by movement of the body-side member and the wheel side member relative to each other, wherein the first defining member comprises a first damping mechanism, and wherein the cylinder comprises the weak portion on a side of the second defining member in the axial direction on which the cylinder is disposed and on the outer side of the cylinder.

18. The suspension device according to claim 1, further comprising a second defining member disposed on a side of the first defining member in the axial direction on which the cylinder is disposed, the second defining member being configured to define space in the cylinder and comprising a second damping mechanism configured to damp vibration generated by movement of the body-side member and the wheel-side member relative to each other, wherein the first defining member comprises a first damping mechanism, and wherein the cylinder comprises the weak portion on a side of the second defining member in the axial direction on which the cylinder is disposed and on the outer side of the cylinder.

19. The suspension device according to claim 1, wherein one of the pair of suspensions contains a damping mechanism and no suspension spring, and another of the pair of suspensions contains a suspension spring and no damping mechanism.

20. A suspension comprising:

- a body-side member that has a tubular shape and is located on a body side;
- a wheel-side member that has a tubular shape and is located on a wheel side and coupled to the body-side member, the wheel-side member being configured to move relative to the body-side member in an axial direction of the body-side member;
- a cylinder of a hollow cylindrical shape that is disposed inside of the body-side member and the wheel-side member and comprises a weak portion in the axial direction on an outer side of the cylinder;
- a rod member that is located inside of the body-side member and the wheel-side member and configured to move relatively in an axial direction of the cylinder in accordance with movement of the body-side member and the wheel-side member;
- a first defining member that is secured to an end portion of the rod member and disposed in contact with the cylinder movably in the axial direction of the cylinder, the first defining member being configured to define space in the cylinder and comprising a first damping mechanism configured to damp vibration generated by movement of the body-side member and the wheel-side member relative to each other;
- a second defining member disposed on a side of the first defining member in the axial direction on which the cylinder is disposed, the second defining member being configured to define space in the cylinder and comprising a second damping mechanism;
- a third defining member disposed on a side of the second defining member in the axial direction on which the cylinder is disposed, the third defining member being configured to define space in the cylinder and configured to move in the cylinder in the axial direction in accordance with movement of the rod member, and
- a cylinder holder whose distal end is disposed in the body-side member, wherein the weak portion is located further on the wheel side than the distal end of the cylinder holder and is configured to reduce a rigidity of the cylinder.

\* \* \* \* \*